July 29, 1969  P. K. DAVIS  3,458,103
STRIP JOINING APPARATUS AND METHOD
Filed Sept. 26, 1966  5 Sheets-Sheet 2

INVENTOR.
PAUL K. DAVIS
BY
Bayham, Mohler, Foster &
Schlemmer
ATTORNEYS

July 29, 1969     P. K. DAVIS     3,458,103
STRIP JOINING APPARATUS AND METHOD
Filed Sept. 26, 1966     5 Sheets-Sheet 5

FIG_10

FIG_9

FIG_11

FIG_12

FIG_7

FIG_13

INVENTOR.
PAUL K. DAVIS
BY
Boyken, Mohler, Foster, &
Schlemmer
ATTORNEYS

United States Patent Office 3,458,103
Patented July 29, 1969

3,458,103
STRIP JOINING APPARATUS AND METHOD
Paul K. Davis, Alameda, Calif., assignor, by mesne assignments, to First Western Bank and Trust Company, San Francisco, Calif., a banking corporation.
Filed Sept. 26, 1966, Ser. No. 581,854
Int. Cl. B23k 1/20
U.S. Cl. 228—5                                                    9 Claims

ABSTRACT OF THE DISCLOSURE

Apparatus for and method of joining adjacent edges of a pair of metal strips. The edges to be joined are initially squared to provide opposed matching edge surfaces, a thickness of material is removed from the marginal portions of the strips along said edges, and said edges are butt welded.

---

The present invention relates generally to the manufacture of products from elongated strips of flat sheet metal, and more particularly to apparatus for and a method of joining adjacent ends of pairs of such strips.

One important use of elongated strips of flat sheet metal is in the fabrication of helically formed sheet metal pipe, such as culvert pipe. A form of machine presently employed for continuous helical formation of sheet metal pipe from sheet metal strips broadly comprises apparatus for storing the sheet metal strip in a coil and removing it therefrom, apparatus for flattening the strip or forming strengthening corrugations therein and feeding the strip to bending apparatus, and bending apparatus which includes means for curling the strip into helical convolutions and joining the adjacent edges of the convolutions. One such machine, with which the present apparatus and method are advantageously utilized, is disclosed in applicant's copending patent application for "Pipe Making Machine and Method," Ser. No. 144,249, filed Oct. 10, 1961, now Patent No. 3,247,692.

Since the helically formed pipe is to be normally provided in standard lengths it is highly desirable that the strip material used in its formation be continuously available throughout the pipe forming operation. Heretofore, when the coil of strip material was exhausted during the forming operation, and therefore the feeding of such material to the pipe forming machine terminated, costly wastage of material at the trailing end of the strip resulted because the material yielded objectionably short lengths of pipe which could not be practically utilized. This problem is eliminated by joining the strip ends, but this has been a costly and time consuming procedure.

Among the problems that are encountered in devising apparatus and procedures for joining ends of sheet metal strips as a preliminary step in forming sheet metal pipe is that of minimizing the period of time in which the feeding of the strip material to the pipe forming machinery is interrupted and thus the time during which the pipe production is halted.

The apparatus employed for this purpose must provide a joint at the strip ends being joined which possesses sufficient strength to withstand the extreme stresses encountered in subsequent strip bending operations and of substantially uniform thickness along its full length, closely approximating the thickness of the strip itself. A joint of this character will permit proper engagement of the strip by the bending or curling members of the pipe forming apparatus so that the strip convolutions will have the desired curvature. Nor will such a joint offer any appreciable increased resistance to bending.

A butt welded joint most suitably satisfied the above noted requisites, but heretofore satisfactory butt welding was made difficult due to the existence of contaminating coatings on the surfaces of the strips to be joined. For example, galvanized steel, commonly utilized in metal culvert pipe production, has a protective coating of zinc on both surfaces to inhibit corrosion. Such coating, if not removed, contaminates and weakens the weld and gives rise to other problems during welding.

It is also highly desirable that the strip joining apparatus be capable of readily accommodating a wide range of strip widths and thicknesses, and it must be at least as versatile in this respect as the pipe forming machine with which it is used.

Briefly, with the apparatus and method of the present invention, adjacent ends of sheet metal strips disposed for successive feeding to pipe forming or other apparatus are joined by welding. Means are first provided along the path of feeding for squaring the strip end edges to be joined prior to the welding thereof to provide opposed matching edge surfaces. Further along the path of feeding are provided apparatus for "scarfing" the strip ends, i.e., removing a thickness of material from the marginal portions of the strips along the edges to be joined, apparatus for positioning and maintaining the edges in abutting relation, and means for welding the abutting edges together.

It is, accordingly, a principal object of the present invention to provide an improved apparatus and method for joining the adjacent end edges of a pair of elongated sheet metal strips.

It is another object of this invention to provide an apparatus and method for joining elongated strips of flat sheet metal, which may be readily utilized in conjunction with existing pipe forming machinery and which has application to a wide range of strip widths and thicknesses.

It is a further object of this invention to provide a sheet metal strip joining apparatus and method in which strip joining may be accomplished rapidly and more economically than heretofore.

It is an additional object of this invention to provide apparatus and method for joining strip metal sheets by a highly uniform and strong butt weld.

It is still further object of the present invention to provide apparatus and method for forming an optimum butt weld between sheet metal strips which have protective or other coatings normally tending to contaminate the weld zone and weaken the weld.

Yet another object of the present invention is the provision of a sheet metal strip joining apparatus and method in which desired precise relative positioning between the strips to be joined and the strip joining apparatus is very readily accomplished where such strips are of a heavy gauge and large width.

Other objects and advantages of this invention will become apparent from the description of one embodiment of the invention taken in connection with the drawings, in which.

Figure 1:
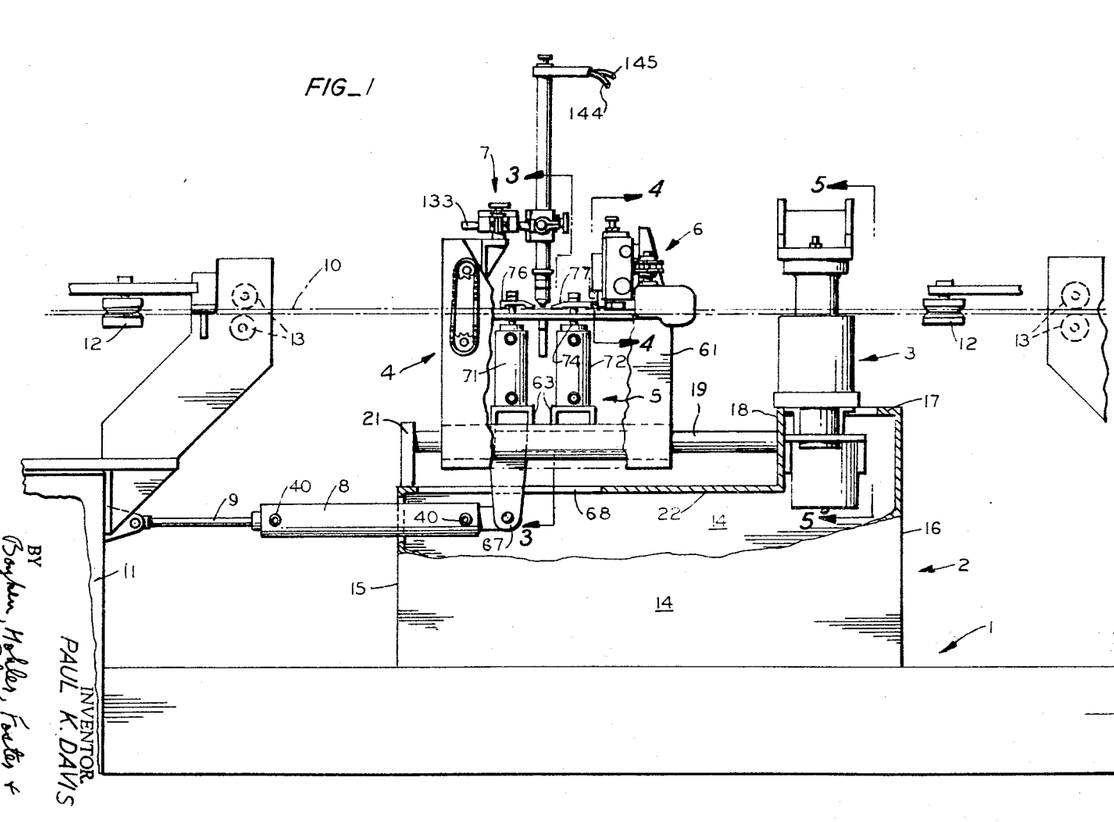
FIG. 1 is a side elevational view of one form of the strip joining apparatus of the present invention with which can be performed the method of this invention.
Figure 2:
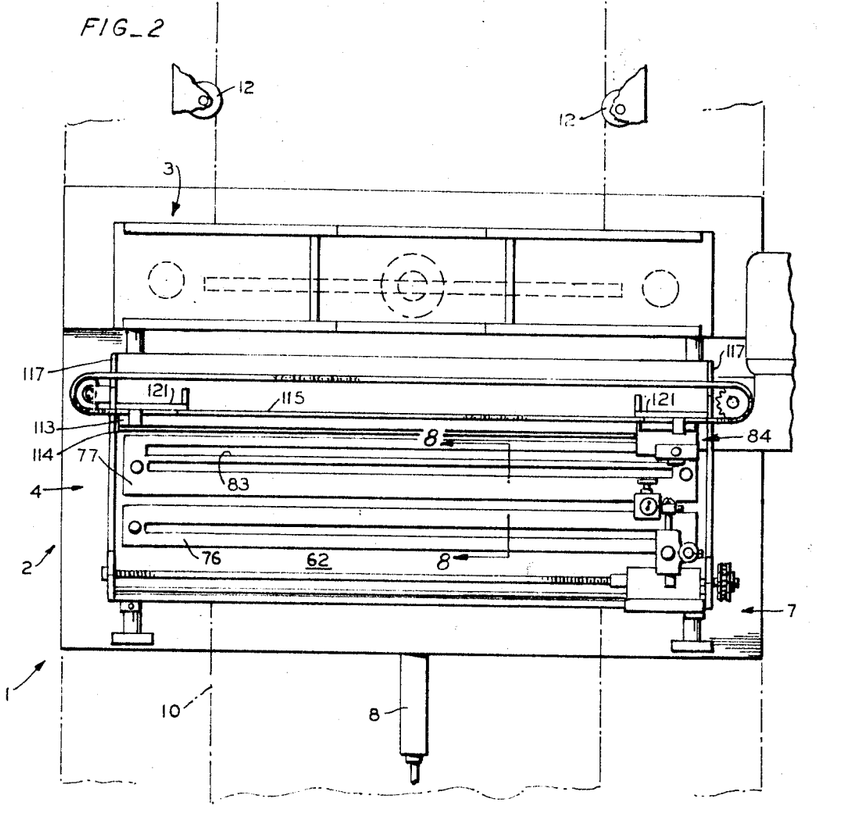
FIG. 2 is a top plan view of the apparatus of FIG. 1.

In detail, referring to FIGS. 1 and 2, the strip joining apparatus comprises an elongated, horizontally disposed stationary base 1. Base 1 extends in parallel relation to the path of movement of the sheet metal strips to be joined, which strips are advanced from a storage station to pipe forming apparatus. Said station and pipe forming apparatus do not form a requisite part of the apparatus of the present invention and, therefore, are not shown. In the figures the sheet metal strips are indicated in broken line at 10. As viewed in FIG. 1 the direction of advance of the strips is from right to left, and in FIG. 2 from top to bottom of the figure. Hereinafter, the words "forward," "rear," "forwardly" and "rearwardly" will be employed with reference to said direction of advance.

Base 1 (FIG. 1) includes an upright support 2 on which are supported a strip shearing apparatus 3 and a carriage 4, which is reciprocably movable on support 2 in the direction of the path of movement of the strips. On carriage 4 are the strip clamping means 5, strip planing or scarfing apparatus 6 and welding means 7. Movement is imparted to carriage 4 by a hydraulic assembly including cylinder 8 and piston rod 9, the forward end of such rod being secured to a separate support 11. Pairs of lateral strip guide rollers 12 and strip feed or drive rollers 13 (FIG. 1) are mounted on stationary supports forwardly and rearwardly of the major portion of the strip joining apparatus. Guide rollers 12 are mounted for rotation about vertical axes and are in opposed relation at each strip side edge, while drive rollers 13 are mounted for rotation about horizontal axes extending normal to the path of advance of the strip and are in driving contact with the top and bottom surfaces of the strip.

Support 2 (FIG. 1) comprises a pair of upright sidewalls 14, a front wall 15 and a rear wall 16, the upper end of the latter forming the rear wall of a rectangular base 17 for shear apparatus 3. The front wall 18 of base 17 supports one end of each of a pair of cylindrical guide rods 19 which extend forwardly proximate each side of support 2 to mounting blocks 21 on the front end of the top wall 22 of support 2, said rods 19 being provided for slidably mounting carriage 4 as will hereinafter be described.

Shear apparatus 3 on base 17 includes a horizontal plate or bed 23 (FIG. 5) extending across base 17 and secured thereto at each end 24. Directly below plate 23 is a transversely extending lower shear arm 31 formed of a pair of spaced, parallel side members 32 connected at the top by a horizontal member 33. Lower arm 31 is connected to plate 23 by a hydraulic cylinder 28 and piston rod 26. Cylinder 28 extends vertically between side members 32 centrally of shear arm 31 and has an enlarged upper end wall 30 secured to the upper surface of horizontal member 33. Piston rod 26 projects upwardly from cylinder 28 through ring seal 27 and terminates in an enlarged upper end 25 secured to the underside of plate 23. Hydraulic fluid lines 29 communicate with the interior of cylinder 28 at the upper and lower ends thereof to conduct fluid into said cylinder for controlling relative movement between cylinder 28 and piston rod 26 through a conventional piston (not shown) movably positioned in the cylinder and mounted therein on piston rod 26. The hydraulic system is of conventional construction and is not illustrated.

Bolted to the upper surface of lower shear arm 31 at each end thereof is the bottom end of a cylindrical post 34 which connects said lower shear arm to a parallel upper shear arm 42 similar to arm 31 but inverted relative thereto. Upper shear arm 42 includes a bottom plate 43 to the lower surface of which the upper ends of posts 34 are secured. Posts 34 pass through and are guided in bushings 39 positioned in circular openings in plate 23 proximate ends 24 thereof.

Figure 7:
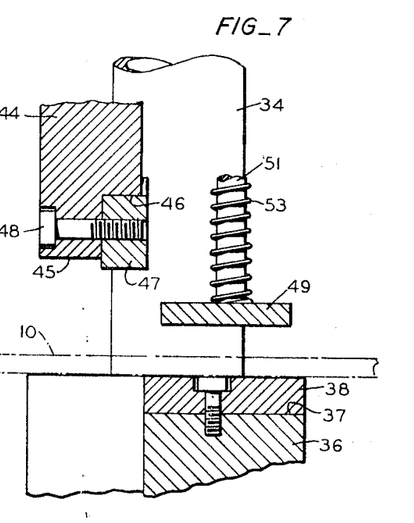
FIG. 7 is an enlarged, fragmentary, sectional view of a portion of the shearing apparatus as seen from line 7—7 of FIG. 5.

On plate 23 between bushings 39 is a bar 36 (FIGS. 5, 7) having an upper horizontal surface 37 to which is bolted a flat rectangular steel shear blade 38. Depending from the bottom of plate 43 of upper shear arm 42 is another bar 44. Bar 44 is generally rectangular in cross-section and includes a bottom edge 45 (FIG. 7) vertically inclined transversely of the path of advance of the strip along the full length of bar 44. As seen in FIG. 7 bar 44 and bar 36 are offset from each other, and a notch 46 is formed in the bottom corner edge of bar 44 facing toward bar 36 and blade 38 thereon. An elongated shear blade 47 of rectangular cross-section is received in notch 46 and bolted in place by bolts 48 with the bottom and side edges of said blade projecting slightly from bar 44. The degree of offset of bar 44 from bar 36 and blade 38 is such that the exposed side edge of blade 47 and adjacent edge of blade 38 are in substantial vertical alignment but with sufficient clearance to permit blade 47 to pass along the near face of blade 38 for shearing a sheet strip when blade 47 is moved downwardly.

Figure 5:
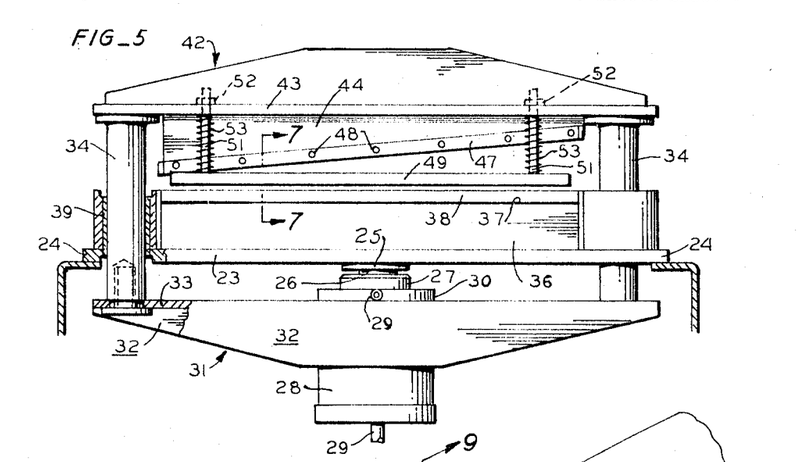
FIG. 5 is an elevational, part-sectional view of the shearing apparatus of the present invention as seen from line 5—5 of FIG. 1.

FIGS. 5 and 7 show the shear apparatus with upper shear blade 47 in the elevated position when strip material is advancing to the pipe forming machinery. When it is desired to shear a strip end to provide a squared edge, hydraulic cylinder 28 is actuated through fluid lines 29 to move downwardly relative to stationary piston rod 26. Cylinder 28 carries therewith as a unit shear arm 31, posts 34, upper shear arm 42, bar 44 and blade 47. Upon downward movement of piston 28, inclined blade 47 progressively shears past blade 38 to produce a cleanly cut edge in a strip positioned between the blades. Blades 38, 47 thus shear the strip normal to the strip side edges and provide a sheared edge surface which is perpendicular to the strip top and bottom surfaces, so that shear apparatus 3 may be termed a strip edge squaring means. After the shearing operation cylinder 28 is reversely actuated to elevate blade 47 and restore the shear apparatus to its initial inoperative position.

It should be noted that the strip to be sheared is clamped proximate the shear blades during the shearing operation by an elongated horizontal pressure plate 49 (FIGS. 5, 7). Plate 49 is positioned directly above blade 38 and is secured at each end to the lower end of a vertically extending rod 51 which passes through an opening in plate 43 of upper shear arm 42. At the upper end of each rod 51, above plate 43, is welded a nut 52 (FIG. 5). Rods 51 are slidable in the opening in plate 43 but nuts 52 are too large to be passed therethrough and therefore normally maintain rods 51 and plate 49 in an elevated position (FIGS. 5, 7) when shear arm 42 is elevated. A coil spring 53 surrounds each rod 51 and extends between plates 43 and 49. As upper shear arm 42 begins to descend plate 49 lowers into engagement with the strip, at which point rods 51 slide upwardly relative to plate 43, so that springs 53 are compressed and plate 49 is pressed against the strip. Springs 53 are sufficiently sturdy to insure secure clamping of the strip being sheared against blade 38.

Carriage 4 comprises a pair of upright side walls 61 (FIG. 1, 3), connected at the top by horizontal plate 62 (FIG. 3) upon which the strips to be joined rest. Strip material is generally available in widths ranging from 12 to 30 inches, and plate 62 is sufficiently wide so that the present apparatus may be used with any such width. A pair of cross-members 63 (FIGS. 1, 3) having an inverted U-shaped cross-section extend in spaced parallel relation between side walls 61, and are welded to the lower portion of the side walls at points generally intermediate the front and rear edges thereof. To provide bushings for the aforementioned guide rods 19 tubular members 64 (FIG. 3) extending the full length of side walls 61 are welded to the underside of cross-members 63 at each end of said members and contain ball bearings 65 in their end portions so that carriage 4 may be readily moved along guide rods 19 with a minimum of sliding friction. A cross-bar 66 (FIG. 3) extends between side walls 61 in engagement with the underside of plate 62 between the front and rear ends thereof for preventing distortion of said plate upon the application of extremely high forces against its upper surface during the strip joining operation.

Hydraulic cylinder 8 (FIG. 1) projects through forward wall 15 of support 2, and at its rear end is rigidly connected to a vertically extending link 67 (FIGS. 1, 3) the upper end of which is welded to the underside of the forwardmost cross-member 63. Forwardly projecting piston rod 9 is stationary, being connected to stationary base 11. Hydraulic fluid lines 40 (FIG. 1) communicate with cylinder 8 at each end thereof whereby fluid may be introduced into cylinder 8 to impart movement to the cylinder relative to rod 9 through a conventional piston (not shown) movably positioned in the cylinder and connected therein with piston rod 9. Cylinder 8 is thus actuated to impart forward or rearward movement to carriage 4 through link 67. Top wall 22 of support 2 is slotted at 68 (FIG. 1) at its forward end to pass link 67 for permitting the desired reciprocal movement.

On each end of forward cross-member 63 is a vertical hydraulic cylinder 71 (FIGS. 1, 3) and on each end of rear cross-member 63 is a similar cylinder 72 (FIG. 1). From the upper end of each cylinder 71 projects a piston rod 73 (FIG. 3), and from the upper end of each cylinder 72, projects piston rod 74 (FIG. 1). Hydraulic fluid lines 75 (FIG. 3) communicate with cylinders 71, 72 at the top and bottom ends thereof for controlling the vertical movement of the pairs of rods 73, 74 respectively, through conventional pistons (not shown). Piston rods 73 are passed through openings in plate 62, and a forward clamping bar 76 (FIGS. 1, 2, 3, 8) is positioned across the upper surface of plate 62 and connected at each end to the enlarged upper end of rods 73 for vertical movement therewith. Similarly, a rear clamping bar 77 (FIGS. 1, 2, 8) is positioned across the upper surface of plate 62 and is connected at each end to the enlarged upper end of piston rods 74 for vertical movement with said rods.

Figure 8:
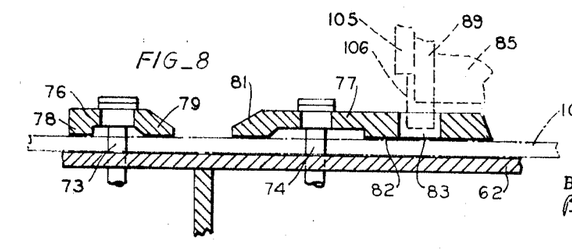
FIG. 8 is an enlarged, fragmentary, sectional view of a portion of the strip clamping means as seen from line 8—8 of FIG. 2, also illustrating a portion of the planing tool in broken line.

As seen in FIG. 8, forward clamping bar 76 includes a forward bearing portion 78 and rear bearing portion 79, and rear clamping bar 77 also includes a forward bearing portion 81 and a rear bearing portion 82, but rear bearing portion 82 is wider in cross-section than portion 79 and is slotted along substantially its full length as at 83 (FIGS. 2, 8). FIG. 8 shows clamping bars 76, 77, in the lowered strip clamping position. While the strip material is feeding through the apparatus clamps 76, 77 are maintained in the elevated position (not shown) by piston rods 73, 74, but at the appropriate time rods 73, 74 may be actuated to lower bars 76, 77 into clamping position, either simultaneously or independently of each other.

At the rear end of carriage 4, mounted for traversing movement along the end edges of the strip material, is the planing or scarfing apparatus 6 (FIGS. 1, 4), by which the marginal end edge portions of the strips are planed preparatory to the welding operation. Planing apparatus 6 includes a cutting tool holder 84 (FIGS. 4, 6) comprising a rectangular block 85 (FIG. 6) having a front face 86 in which are formed a pair of vertically extending flat recesses 87 and an intermediate rounded groove 88. Metal screws or bolts secure a pair of retaining bars 89 to front surface 86 in overlying relation to recesses 87, and a rectangular plate 92 is slidingly received in the channel which is defined by recesses 87 and bars 89. Plate 92 is screwed at its upper end to a semi-circular lug 93 which is received in groove 88. Plate 92 does not extend the full length of the front face 86 of block 85 so that lug 93 is spaced from the upper surface of block 85.

Figure 9:
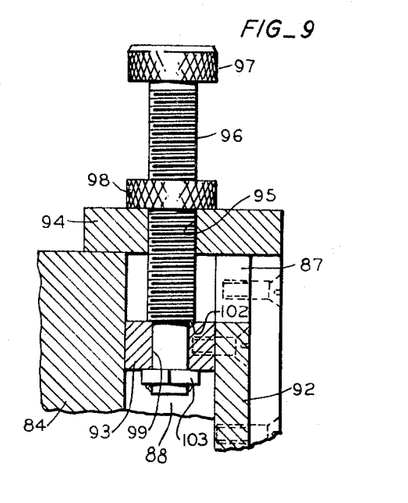
FIG. 9 is an enlarged, fragmentary sectional view of a portion of the planing tool holder as seen from line 9—9 of FIG. 6.

Another plate 94 is secured to the top of block 85 overlying the upper ends of recesses 87, groove 88 and bars 89, and a threaded aperture 95 (FIG. 9) in plate 94 centered over the upper end of groove 88 threadedly receives an adjusting screw 96, having a knurled head 97 at the upper end. A threaded collar 98 is carried on screw 96 above plate 94, and an aperture 99 in lug 93 and coaxial with aperture 95 receives the lower end of screw 96 which is reduced in diameter at a shoulder 102, which shoulder rests on lug 93. A stop nut 103 is welded to the lower end of screw 96 so that its upper surface engages lug 93, but said lower end is freely rotatable in aperature 99. When collar 98 on screw 96 is spaced from plate 94 screw 96 is adjustable vertically relative to plate 94 and block 85 and lug 93 and vertical plate 92 slide with it. Screw 96, lug 93 and plate 92 may then be locked in the desired vertical position by tightening collar 98 against plate 94.

A vertically extending L-shaped bracket 104 (FIG. 6) is secured to the outer surface of plate 92 and includes a forward flange portion 105 for gripping a cutting tool 106 and clamping said cutting tool against plate 92. Cutting tool 106 may be of a high-carbon steel or a steel alloy of high hardness and is positioned in bracket 104 with its lower end projecting below plate 92 and terminating in a cutting edge 109.

Figures 3, 4:
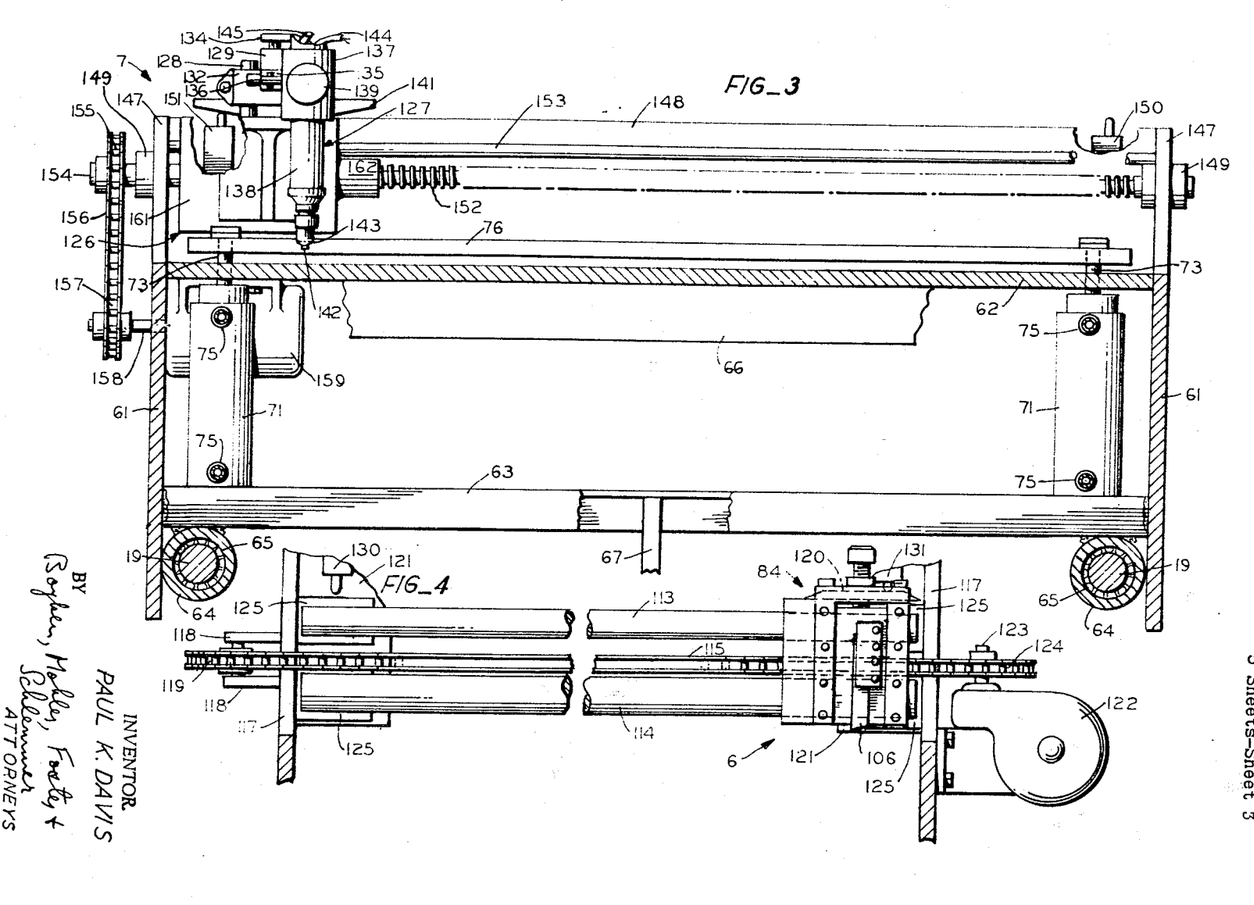
FIG. 3 is an elevational, part-sectional view of a portion of the apparatus of FIG. 1, on a scale enlarged relative thereto, as seen from line 3—3 of FIG. 1, viewed in the normal direction of advance of the strip to be joined, particularly illustrating the welding means and associated structure.
FIG. 4 is an elevational, part-sectional view of a portion of the apparatus of FIG. 1 as seen from line 4—4 of FIG. 1 in the direction opposite the direction of advance of the strip to be joined, on a scale enlarged relative to FIG. 1, illustrating the planing or scarfing apparatus of the present invention.

To movably support cutting tool holder 84 on carriage 4 there is provided at each rear corner of carriage plate 62 an upstanding bracket 117 (FIGS. 2, 4) including an inwardly directed wall 121. Welded to the front of each wall 121 are a pair of vertically spaced mounting blocks 125 (FIG. 4). To the upper blocks 125 are welded the opposite ends of a cylindrical shaft 113 (FIGS. 2, 4, 6) which extends across carriage 4 between said blocks 125, and to the lower blocks are welded the opposite ends of a parallel lower shaft 114 of slightly larger diameter. Cutting tool holder 84 slides along shafts 113, 114, which are respectively received in cylindrical bores 107, 108 (FIG. 6) extending sideways through block 85 generally tangential with the rear surface of said block so that bores 107, 108 have open rear portions 111, 112, respectively.

Figure 6:
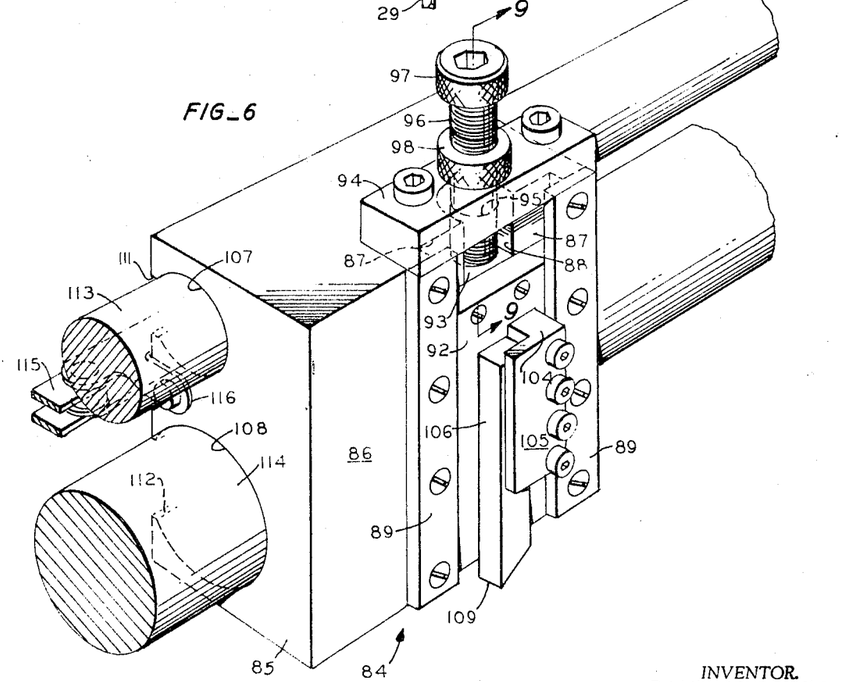
FIG. 6 is an enlarged isometric view of the planing tool holder of the present invention.

Transverse movement is imparted to tool holder 84 through an endless drive chain 115 (FIGS. 2, 4, 6) which extends across the rear face of block 85 and is attached to said block at each side thereof by a fastener passed through a forwardly projecting chain link 116 (FIG. 6). Chain 115 is engaged around a sprocket wheel 119 (FIG. 4) rotatably mounted on a pair of lugs 118 projecting outwardly from the left-hand bracket 117, as seen in FIG. 4, and is also engaged around a sprocket wheel 124 rigid on a shaft 123 projecting from a reversible electric motor 122 mounted externally of the right-hand bracket 117 as seen in FIG. 4.

Electric motor 122 is in a conventional electrical circuit and may be energized to initiate movement of tool holder 84 across carriage 4 (from right to left in FIG. 4) for the planing operation, until a trip member 120 on holder 84 engages a microswitch 130 on bracket 117 on the opposite side of carriage 4. When it is desired to return tool holder 84 to its initial position motor 122 may be energized to rotate in the reverse direction, and holder 84 will be moved across carriage 4 until trip member 120 engages another microswitch 131.

As best seen in FIG. 1 the front portion of planing apparatus 6 is disposed directly above the rearmost portion of strip clamping means 5, so that, referring to FIG. 8, the lower end of cutting tool 106 may be lowered through slot 83 in rear clamping bar 77 into engagement with a strip of metal 10 during the planing operation.

Welder means 7 (FIGS. 1, 2, 3) is at the forward end of carriage 4 and includes a welding torch mount 126 (FIG. 3) and welding torch 127 supported at said forward end for movement across carriage 4. Looking at FIG. 3, welding torch mount 126 includes an upstanding post 128 upon which is carried a support member 129 having an adjustable collar 132 receiving said post 128. Support member 129 is bored for slidably receiving a forwardly extending rod 133 (FIG. 1), and an adjusting screw 134 projects through member 129 into engagement with rod 133. At the rear end of rod 133 is an adjustable collar 135 which receives a transversely extending stub rod 136 which projects from a collar 137 positioned for receiving the vertically extending jacket 138 of torch 127. Adjusting screw 139 projects through collar 137 into engagement with jacket 138. Thus, torch 127 is vertically adjustable by means of collar 137 and adjusting screw 139, forwardly or rearwardly by means of rod 133 and adjusting screw 134, and is swingable about a vertical axis by means of post 128 and adjustable collar 132. This permits precise positioning of torch 127 in the most desirable welding position as well as movement away from the weld area to facilitate access thereto when desired.

A form of welder well suited for use in the apparatus of the present invention is the tungsten inert-gas or "Tig" arc welder. Such a welder is manufactured by Air Reduction Company of New York, N.Y., and is carried in their Heliweld welding equipment line. In this form of welder, as seen in FIG. 3, nonconsumable tungsten electrode 142 is carried within jacket 138 with its outer tip projecting slightly through the open end of a nozzle 143 attached to the end of jacket 138. An electrical power cable 144 (FIGS. 1, 3) and a gas supply line 145 are also within jacket 139, the power cable 144 being electrically connected to a conventional welding machine current source (not shown) for creating the arc between electrode and work piece, and the gas line 145 being connected with a conventional gas tank or other source of inert-gas under pressure (not shown) such as argon or helium. The inert-gas is ejected from nozzle 143 around electrode 142 and functions as a medium for shielding the arc and weld zone from contamination.

To support welding torch mount 126, upstanding brackets 147 (FIG. 3) at each front corner of carriage plate 62 are connected by a transversely extending front wall 148, with each bracket 147 carrying a journal bearing 149 which rotatably receives an end of a transversely extending shaft 152 (FIG. 3) which is threaded along substantially its full length inwardly of bearings 149. A second shaft 153, having a smaller diameter than shaft 152, extends above and in parallel relation to shaft 152 and is secured at each end to bracket 147.

Body member 161 of torch mount 126 is bored transversely to receive shafts 152, 153, and a threaded collar 162 is integral with body member 161 at the inner end of the lower bore for threadedly receiving shaft 152.

One end 154 of shaft 152 (the left-hand end in FIG. 3) projects outwardly of bracket 147 and carries a sprocket wheel 155 around which is engaged an endless chain 156 which is also engaged around a sprocket wheel 157 rigid on a drive shaft 158 projecting from a reversible electric motor 159 secured to the underside of plate 62. Motor 159 is connected in a conventional electric circuit for energization to rotate shaft 152 through chain 156. As shaft 152 is rotated torch mount 126 moves therealong and along stationary guide shaft 153 until a trip member 141 on torch mount 126 engages a microswitch 150 on wall 148 (FIG. 3) at the opposite end of carriage 4. Torch mount 126 is moved in the reverse direction by reversing the rotation of motor 159, and the reverse movement is terminated when another microswitch 151 is engaged by trip member 141.

In operation, to feed the strip material 10 to the pipe forming apparatus which advantageously is employed in conjunction with the present invention, front and rear drive rollers 13 (FIG. 1) together with other feed rollers (not shown) on said pipe forming apparatus are actuated to advance said strip between guide rollers 12. While strip 10 is moving, upper shear blade 47, cutting tool 106, clamping bars 76, 77 and welding torch 127 are elevated above said strip, which passes across lower shear blade 38 and carriage plate 62. As a coil of strip material becomes exhausted the drive rollers are stopped and the trailing edge of the strip is positioned slightly rearwardly of shear apparatus 3. Positioning the strip end edges by drive rollers 13 and the remaining above-described rollers is an imprecise operation due to the large mass of the driving elements and inability to accurately control and reverse the direction of movement of the strip material, particularly strip material which has been partially formed into pipe.

With the trailing end 163 (FIG. 10) of the exhausted strip projecting rearwardly from shear apparatus 3, upper shear blade 47 is lowered to sever the strip and provide a clean, squared end edge. An edge of this character is critical to a uniform and strong butt weld as is made with the present apparatus, and there is considerable variation in the quality of the end edges of the unsheared strip. After shear blade 47 is retracted the sheared trailing edge is advanced by the forward drive rollers to a position on the rear portion of carriage plate 62. Hydraulic cylinder 8 is then actuated to move carriage 4 forwardly or rearwardly to precisely align cutting tool 106 with the sheared trailing edge, and clamping bars 76, 77 are lowered into clamping position. The trailing edge is now clamped in position for the planing operation.

The sheet metal material most frequently used in the fabrication of culvert and similar pipe is zinc coated, i.e., galvanized steel. Used to a much lesser extent are non-galvanized steel to which an asphalt coating is applied after the pipe has been formed, and aluminum. With all of these materials major problems arise in attempting to join their edges by an arc welding process due to contaminating elements on the metal surfaces. The nongalvanized materials have a mill scale or oxidation coating, the impurities from which enter the weld zone to cause a defective weld of low weld strength. The zinc from the galvanizing coating produces the same result and presents the further problem of a rapid zinc build up on the welder electrode requiring frequent discontinuance of the welding operation which causes much delay and an imperfect non-uniform weld.

Figure 10:
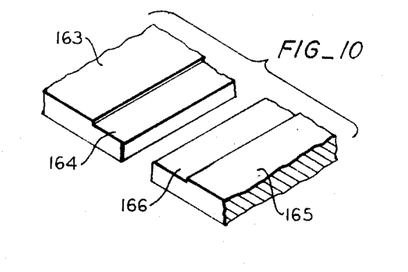
FIG. 10 is a perspective view of portions of the adjacent end edges of a pair of metal strips as they appear immediately after the planing operation and prior to joining.

To remove the above-described impurities from the weld zone, cutting edge 109 of cutting tool 106 is positioned a distance below the upper surface of the strip trailing end 163 for removing a thickness of material at least as great as the thickness of the contaminating layer. Cutting tool holder 84 is then actuated to move across the strip end edge to plane or scarf the marginal edge portion 164 of the trailing end 163 (FIG. 10). Thereafter tool holder 84 is returned to its initial position. A single pass is normally sufficient to complete the planing operation. The adjustability of cutting tool 106 as well as the remaining elements of the strip joining apparatus permits said apparatus to accommodate a wide range of sheet thicknesses. After trailing edge portion 164 is planed, clamping bars 76, 77 are elevated and forward drive rollers 13 are actuated to advance the strip trailing edge to the forward portion of plate 62.

Next, the leading end 165 (FIG. 10) of the succeeding strip is drawn from a coil thereof through rear drive rollers 13 and guide rollers 12 until the edge thereof is positioned slightly forwardly of shear apparatus 3. Upper shear blade 47 is lowered to shear leading end 165 in the manner above-described and then retracted, and rear drive rollers are actuated to advance the sheared edge to a position on the rear portion of plate 62 of carriage 4. Carriage 4 is then moved forwardly or rearwardly through hydraulic cylinder 8 until cutting tool 106 is aligned with the leading edge, after which rear clamping bar 77 is lowered into clamping position so that rear bearing portion 82 thereof is clamped against the leading end of the strip. The marginal edge portion 166 of the succeeding strip is then planed in a manner similar to the trailing edge portion 164 of the preceding strip. Tool holder 84 thereafter is moved to its initial position and clamping bar 77 is elevated.

Figure 11:
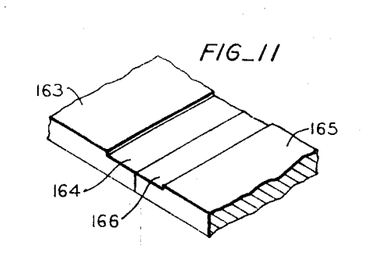
FIG. 11 illustrates the strip end edges of FIG. 10 after they have been brought into abutting relation.

Carriage 4 is next moved rearwardly relative to leading edge portion 166 until said edge is positioned directly below welding torch 127, and rear clamping bar 77 is lowered into clamping position against leading end 165. Carriage 4 is then moved forwardly, drawing the strip with it, until leading end 165 abuts trailing end 163 as in FIG. 11, at which time forward clamping bar 76 is lowered into clamping position against trailing end 163.

With the end edges in abutting relation (FIG. 11) and directly below welding torch 127 the arc is struck, and the torch is moved transversely across strip edge portions 164, 166 with the result that said portions are fused to provide a uniform butt weld 167 (FIG. 12) having excellent weld properties.

Figure 12:
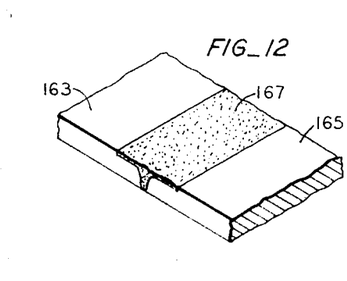
FIG. 12 illustrates the strip end edges of FIG. 10 after they have been butt welded to complete the welded joint.

At weld 167 the strip joint is substantially the thickness of the strip itself, with no deformed or overlapped edge portions or excess weld material which would objectionably resist bending or cause the pipe forming apparatus to perform inaccurately or jam during the pipe forming operation.

From the hereinabove description it is seen that a sheet metal strip joining method is provided wherein a pair of strips are supported for movement in a path of travel extending longitudinally thereof. While the strips are so supported the adjacent end edges are squared to provide opposed matching edge surfaces. Prior to the welding of the edges a thickness of material is removed from a marginal portion of each strip of generally uniform width fully along the edges. The edges are positioned in abutting relation and are welded together.

Figure 13:
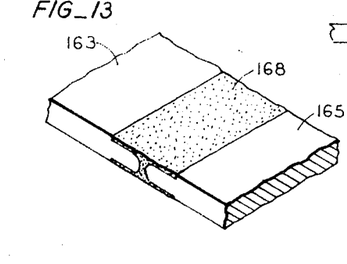
FIG. 13 is a perspective view of a modified form of butt weld which results from performing the planing and welding operations on both opposite surfaces of the metal strips being joined.

It is to be understood that the claims appended hereto are intended to cover all changes and modifications to the invention disclosed herein which do not depart from the spirit and scope of the invention. For example, apparatus similar to clamping means 5, planing apparatus 6 and welding means 7 may be provided at the underside of the strip to be joined, as well as the upper surface, for producing a welded joint as shown at 168 in FIG. 13, in which welds are formed across both surfaces. As a further variation, the sequence of operations may be modified to accomplish simultaneous planing of the leading and trailing edge portions. While the present apparatus and method have been described as being advantageously employed in conjunction with pipe formation apparatus it is clearly not limited to such application but rather can be utilized wherever it is desired to join strips of sheet metal.

I claim:

1. Apparatus for joining adjacent edges of a pair of elongated sheet metal strips disposed for movement in a path of travel in a direction longitudinally of said strips, comprising:
   (a) means for positioning said edges in generally abutting relation;
   (b) means for maintaining said edges in such generally abutting relation;
   (c) means movable along said edges for removing a thickness of material from a marginal portion of each of said strips of uniform width fully along said portion in the direction of said edges; and
   (d) welding means movable along said edges for welding said edges together.

2. The apparatus of claim 1, in which:
   (e) said welding means is movably supported for adjustable movement along said path; and
   (f) said welding means includes:
      (i) a welding torch supported for movement along said edges, and
      (ii) apparatus for so moving said welding torch.

3. The apparatus of claim 1, in which:
   (e) said means for removing said thickness of material includes:
      (i) a planing tool supported for movement along said marginal portions in cutting relation thereto, and
      (ii) apparatus for so moving said planing tool.

4. In the apparatus of claim 1:
   (e) said means for removing said thickness of material and said welding means being movably supported for adjustable movement along said path;
   (f) means for so moving said two last named means.

5. The apparatus of claim 1, further including:
   (e) a stationary base positioned along said path;
   (f) a carriage mounted on said base for adjustable movement along said path;
   (g) means for so moving said carriage;
   (h) means on said carriage mounting said means for removing said thickness of material for movement therewith; and
   (i) means on said carriage mounting said welding means for movement therewith.

6. Apparatus for joining the trailing end of an elongated strip of sheet metal disposed for movement in a generally horizontal path of travel in a direction longitudinally of the strip with the leading end of an adjacent strip similarly disposed for movement in said path, comprising:
   (a) a base positioned along said path;
   (b) a carriage movably supported on said base for adjustable movement along said path;
   (c) shearing means on said base disposed across said path for shearing said leading and trailing ends to provide squared edges;
   (d) planing means on said carriage supported for movement across said path for planing marginal portions of said leading and trailing ends;
   (e) welding means on said carriage supported for movement across said path for welding said edges of said leading and trailing ends together;
   (f) clamping means on said carriage including:
      (i) strip clamping members positioned across said path in spaced parallel relation, and
      (ii) apparatus on said carriage for moving said clamping members to and from strip clamping position.

7. In the apparatus of claim 6:
   (g) said carriage and said clamping means being adapted for positioning said edges in generally abutting relation.

8. In the apparatus of claim 6:
   (g) said planing means including:
      (i) a body member supported for movement across said path,
      (ii) a slide member carried on said body member for vertical sliding movement relative to said body member,
      (iii) mechanism for adjusting the vertical position of said slide member relative to said body member, and (iv) a cutting tool mounted on said slide member for vertical movement therewith.

9. In apparatus for joining adjacent edges of a pair of elongated sheet metal strips including positioning means for positioning said edges in generally abutting relation, means for maintaining said edges in such generally abutting relation and welding means for welding said edges together, means for removing a thickness of material from a marginal portion of each of said strips of generally uniform width fully along said edges, comprising:
  (a) a body member supported for movement across said strips;
  (b) apparatus for so moving said body member;
  (c) a slide member carried on said body member for sliding movement relative to said body member;
  (d) mechanism for adjusting the position of said slide member relative to said body member; and
  (e) a cutting tool mounted on said slide member for movement therewith.

References Cited

UNITED STATES PATENTS

| | | | |
|---|---|---|---|
| 1,771,961 | 7/1930 | Ipsen | 29—483 |
| 2,078,365 | 4/1937 | Biggert | 29—33.21 |
| 2,975,265 | 3/1961 | Kaiser | 29—33.21 |

RICHARD H. EANES, Jr., Primary Examiner